United States Patent
Kusase

[11] Patent Number: 5,177,391
[45] Date of Patent: Jan. 5, 1993

[54] POWER GENERATING APPARATUS

[75] Inventor: Shin Kusase, Obu, Japan

[73] Assignee: Nippondenso Co., Ltd., Kariya, Japan

[21] Appl. No.: 888,377

[22] Filed: May 22, 1992

Related U.S. Application Data

[63] Continuation of Ser. No. 668,124, Mar. 12, 1991, abandoned.

[30] Foreign Application Priority Data

Mar. 14, 1990 [JP] Japan .................. 2-063482

[51] Int. Cl.$^5$ .................. H02K 1/22; H02K 21/04; H02K 16/02
[52] U.S. Cl. .................. 310/263; 310/114; 310/181
[58] Field of Search .......... 310/114, 126, 181, 156, 310/263; 322/46

[56] References Cited

U.S. PATENT DOCUMENTS

| | | | |
|---|---|---|---|
| 2,516,114 | 7/1950 | Green | 310/156 |
| 3,508,095 | 4/1970 | Knudson et al. | 310/156 |
| 3,671,788 | 6/1972 | Knudson et al. | 310/156 |
| 4,035,713 | 7/1977 | Kawamoto et al. | 322/46 |
| 4,513,216 | 4/1985 | Muller | 310/156 |
| 4,642,502 | 2/1987 | Carpenter et al. | 310/156 |
| 4,654,551 | 3/1987 | Farr | 310/181 |
| 4,658,167 | 4/1987 | Popov et al. | 310/156 |
| 4,739,201 | 4/1988 | Brigham et al. | 310/156 |
| 4,777,397 | 10/1988 | Parshall | 310/156 |
| 4,882,515 | 11/1989 | Radomski | 310/263 |
| 4,959,577 | 9/1990 | Radomski | 310/263 |
| 4,980,595 | 12/1990 | Arora | 310/263 |

FOREIGN PATENT DOCUMENTS 63-77362   4/1988   Japan .

*Primary Examiner*—R. Skudy
*Assistant Examiner*—C. LaBalle
*Attorney, Agent, or Firm*—Cushman, Darby & Cushman

[57] ABSTRACT

An a.c. generator having a stator including an armature core and a polyphase output winding wound around the armature core. A plurality of rotors mounted on a rotary shaft to establish a first and a second field magnetic circuits are arranged in parallel with respect to the armature core. The first field magnetic circuit includes permanent magnets acting as a source of exciting magnetomotive force, while the second field magnetic circuit includes a field winding acting as a source of exciting magnetomotive force. The magnetic fluxes generated from the first and second field magnetic circuits penetrate the armature core inducing an output voltage across the polyphase output winding. The magnetic flux from the second field magnetic circuit is changed so as to increase or decrease the total magnetic flux penetrating the armature core thereby controlling the induced output voltage.

8 Claims, 4 Drawing Sheets

POWER GENERATING APPARATUS

This is a continuation of application Ser. No. 07/668,124, filed on Mar. 12, 1991, now abandoned.

BACKGROUND OF THE INVENTION

1. Field of the Invention

This invention relates to a power generating apparatus suitable for use as an a.c. generator for an automotive vehicle.

2. Description of the Related Art

In order that a small-sized and light-weight a.c. generator having a small-sized rotor can generate a high power output, its rotor is required to generate a large amount of magnetic flux. A method for attaining the above requirement in such an a.c. generator is known in which a permanent magnet is used in combination with the field winding so a to generate a large amount of magnetic flux. However, this method has the drawback that the field magnetomotive force in the generator cannot be satisfactorily controlled. A method which solves the above problem and attains the desired control of the field magnetomotive force in an a.c. generator is disclosed in, for example, JP-A-63-77362. According to the disclosure of JP-A-63-77362 cited above, the centrifugal force is utilized to cause displacement of part of the magnetic path in such a generator thereby regulating the amount of generated magnetic flux. Also, U.S. Pat. No. 4,882,515 discloses an a.c. generator in which a field coil and a permanent magnet are disposed between a set of claw-type magnetic pole members so as to couple two magnetic circuits thereby regulating the amount of generated magnetic flux.

The former cited above is advantageous in that the output of the permanent magnet relative to the rotation speed of the generator can be regulated to produce a predetermined field magnetomotive force so as to maintain constant the output voltage of the generator. However, the former has a problem that a variation of the load demand leads to a corresponding variation of the output voltage of the generator.

On the other hand, in the case of the latter cited above, the ends of the claw-type magnetic pole members are required to be accurately positioned relative to each other so as to reliably couple the two magnetic circuits. Thus, the later has the problem that the assembling of the components of the generator is difficult, and the structure of the generator becomes inevitably complex.

SUMMARY OF THE INVENTION

It is an object of the present invention to provide a power generating apparatus whose output voltage can be easily regulated.

Another object of the present invention is to provide a power generating apparatus in which two magnetic circuits are disposed in parallel to each other so as to facilitate assembling of the components of the apparatus and also to simplify the structure of the apparatus.

Still another object of the present invention is to provide a power generating apparatus in which the two magnetic circuits are arranged independently of each other so that their permanent magnets may not be adversely affected by the heat generated from its field coil.

An embodiment of the power generating apparatus according to the present invention comprises a stator including an armature core and a polyphase winding wound around the armature core for generating an output, and a plurality of rotors disposed inside the armature core and mounted on a rotary shaft. The rotors establish a first and a second field magnetic circuit arranged in parallel with respect to the armature core. The first field magnetic circuit includes a plurality of permanent magnets acting as a source of exciting magnetomotive force, and the second field magnetic circuit independent of the first field magnetic circuit includes a field winding forming an electromagnet acting as a source of exciting magnetomotive force. The magnetic flux generated from the first field magnetic circuit and that generated from the second field magnetic circuit penetrate the armature core and induce an output voltage across the polyphase winding. The magnetic flux generated from the second field magnetic circuit changes so as to increase or decrease the total magnetic flux penetrating the armature core, thereby controlling the induced output voltage.

DESCRIPTION OF THE PREFERRED EMBODIMENTS

Figure 1:
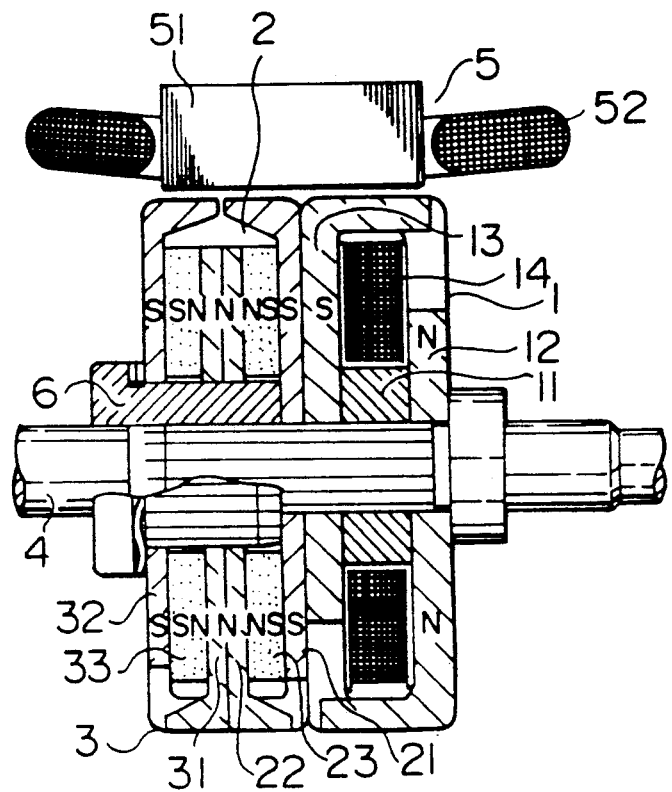
FIG. 1 is a schematic sectional view showing principal parts of a first embodiment of the power generating apparatus of the present invention.

Referring now to FIG. 1 which is a schematic sectional view showing principal parts of a first embodiment of the power generating apparatus of the present invention, the power generating apparatus comprises a first, a second and a third claw pole type rotor 1, 2 and 3, a rotary shaft 4 supporting these rotors 1, 2 and 3, and a stator 5 disposed outside of the rotors 1, 2 and 3.

Figure 2:
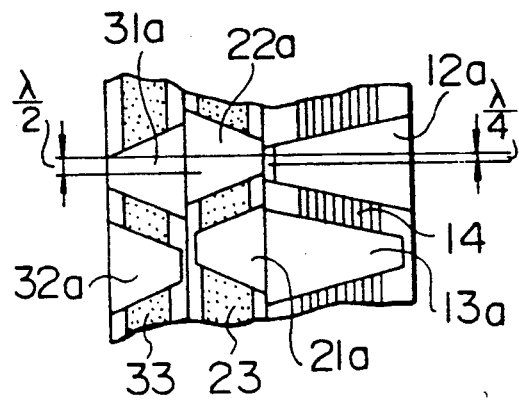
FIG. 2 is a schematic plan view showing principal parts of the rotors in the first embodiment shown in FIG. 1.

The first rotor 1 is composed of a cylindrical hub 11 fixed to the outer surface of the shaft 4, first and second claw poles 12 and 13 disposed on both sides respectively of the cylindrical hub 11, and a field winding 14 disposed radially outside of the cylindrical hub 11. As shown in FIG. 2, first and second claw portions 12a and 13a are integrally formed as parts of the first and second claw poles 12 and 13 respectively. These claw portions 12a and 13a extend toward the cylindrical hub 11 and are alternately arranged as shown. The first and second claw portions 12a and 13a have a trapezoidal shape.

As in the case of the first rotor 1, the second and third rotors 2 and 3 include third and fourth claw poles 21, 22 and fifth and sixth claw poles 31, 32, respectively. As also shown in FIG. 2, these third, fourth, fifth and sixth claw poles 21, 22, 31 and 32 are respectively formed with third, fourth, fifth and sixth claw portions 21a, 22a, 31a and 32a which are similarly alternately arranged. A first disc-shaped permanent magnet 23 is inserted between the third and fourth claw poles 21 and 22, and a second disc-shaped permanent magnet 33 is inserted between the fifth and sixth claw poles 31 and 32. These first and second magnets 23 and 33 are axially magnetized so that their confronting surfaces act as the N poles.

The outer diameters of the first, second and third rotors 1, 2 and 3 are substantially the same.

The rotary shaft 4 is driven by an engine (not shown) through a belt, and a commutator (not shown) connected to the field winding 14 is mounted on one end of the shaft 4.

The stator 5 is composed of a stator core 51 and a three-phase concentrated stator winding 52. The stator core 51 is formed with slots the number of which is three times as many as the number of poles of the first and second claw portions 12a and 13a of the claw poles 12 and 13 of the first rotor 1.

As shown in FIG. 1, a sleeve 6 of a non-magnetic material is fixed to the outer surface of the shaft 4, and the first magnet 23 and the fourth claw poles 22 of the second rotor 2 are disposed, together with the fifth and sixth claw poles 31, 32 and the second magnet 33 of the third rotor 3, on the outer circumferential surface of this sleeve 6.

The numbers of the first, second, third, fourth, fifth and sixth claw portions 12a, 13a, 21a, 22a, 31a and 32a of the first, second and third rotors 1, 2 and 3 are the same respectively. The angular positions of their magnetic poles (that is, the angular positions of the claw portions) are substantially the same, but are slightly displaced from each other as shown in FIG. 2. More precisely, each of the first claw portions 12a of the first rotor 1 is displaced by $\lambda/4$ relative to the corresponding fourth claw portion 22a of the next adjacent second rotor 2, and each of the fifth claw portions 31a of the next adjacent third rotor 3 is displaced by $\lambda/2$ relative to the corresponding fourth claw portion 22a of the second rotor 2. The symbol $\lambda$ designates the so-called slot ripple wavelength.

Figure 3:
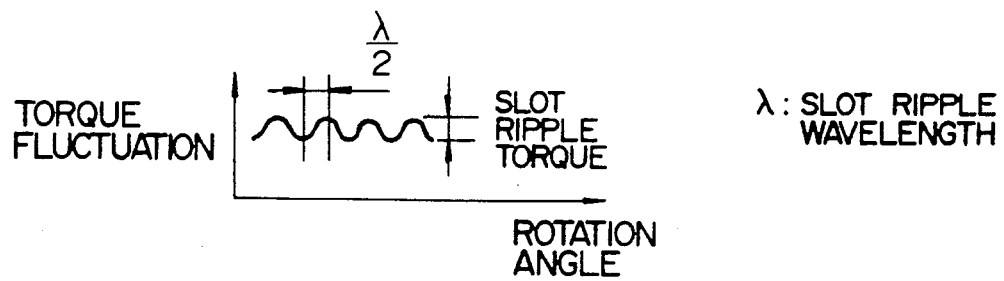
FIG. 3 is a graph generally showing the relation between the rotation angle of the rotors and a fluctuation of the torque of the rotors.

As shown in FIG. 3, this slot ripple designates a magnetic reluctance fluctuation occurring between the slots of the core 51 of the stator 5 and the first to sixth claw portions 12a, 13a, 21a, 22a, 31a and 32a of the first to third rotors 1, 2 and 3, and the slot ripple wavelength is equal to the pitch of the slots of the stator core 51.

Figure 4:
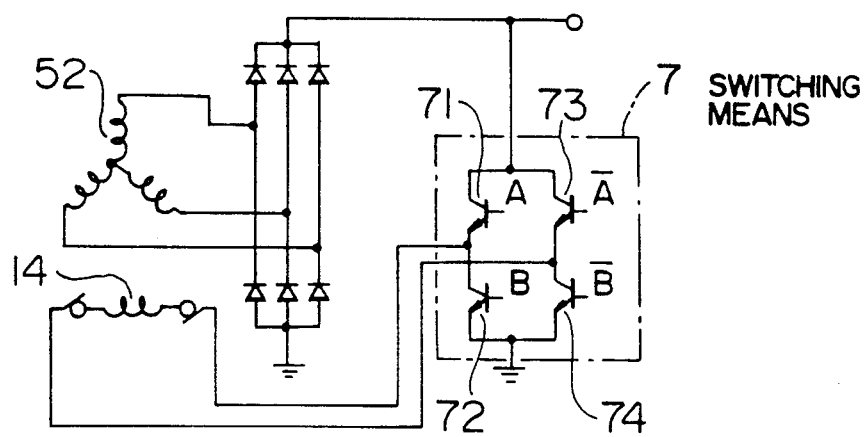
FIG. 4 is a simplified electrical circuit diagram of the first embodiment shown in FIG. 1.

Switching means 7 shown in FIG. 4 will now be described. This switching means 7 includes four transistors 71, 72, 73 and 74, and the transistors 71, 72 and the transistors 73, 74 are connected in parallel with each other. The field winding 14 is connected at one end to the connection point between the transistors 71, 72 and at the other end to the connection point between the transistors 73, 74.

Figure 5:
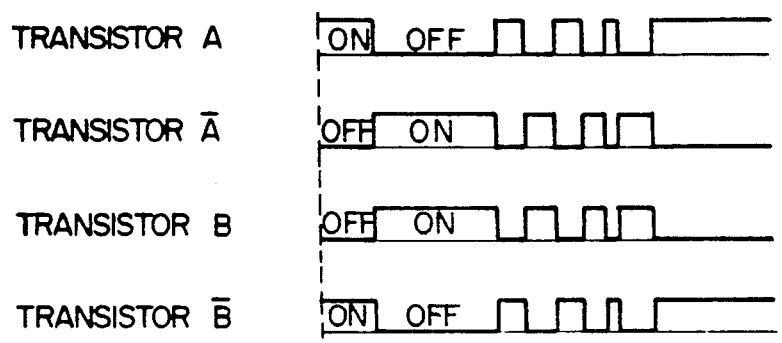
FIG. 5 shows waveforms of input signals applied to the bases of the respective transistors shown in FIG. 4.

On-off signals as shown in FIG. 5 are applied to the bases of the respective transistors 71, 72, 73 and 74 so as to change the direction of current supplied to the field winding 14 and so as to control the current supplied to the field winding 14.

In the basic construction of the power generating apparatus described above, the magnetic flux generation capability of the first rotor 1 (directed to the stator core 51) is selected to be substantially equal to the total magnetic flux generation capability of the second and third rotors 2 and 3. That is, the first, second, third, fourth, fifth and sixth claw portions 12a, 13a, 21a, 22a, 31a and 32a shown in FIG. 2 correspond to the partial figure with one pole pitch span on the rotor in the stator 5, and their outer surface areas are selected so as to satisfy the relation expressed as (the outer surface areas of the first and second claw portions 12a and 13a)$\approx$(the outer surface areas of the third and fourth claw portions 21a and 22a)+(the outer surface areas of the fifth and sixth claw portions 31a and 32a).

The operation of the power generating apparatus embodying the present invention will now be described.

When the load is heavy, and the output of the generator itself is required, the magnetic fluxes generated from the permanent magnets 23 and 33 of the second and third rotors 2 and 3 flow toward the stator core 51, and the field current is supplied through the switching means 7 to the field winding 14 in one direction, so that the direction of flow of the magnetic flux generated from the field winding 14 is the same as the direction of flow of the magnetic fluxes from the permanent magnet 23 and 33 toward the stator core 51. That is, the transistors 72 and 73 in the switching means 7 are turned off while turning on the transistors 71 and 74.

As a result, the magnetic fluxes from the permanent magnets 23 and 33 of the second and third rotors 2 and 3 flow across the stator winding 52 together with the magnetic flux from the field winding 14 of the first rotor 1. Thus, a large amount of magnetic flux flows across the stator winding 52.

The switching means 7 also controls the field current supplied to the field winding 14 so that the battery voltage can be maintained at a predetermined level.

That is, when an amount of magnetic flux larger than that generated from the permanent magnets 23 and 33 of the second and third rotors 2 and 3 is required, the field current is supplied to the field winding 14 in one direction so that the direction of flow of the magnetic flux from the field winding 14 is the same as the direction of flow of the magnetic fluxes from the permanent magnets 23 and 33.

On the other hand, when the load is relatively light, and the amount of the magnetic fluxes generated from the permanent magnets 23 and 33 of the second and third rotors 2 and 3 can sufficiently provide the required output of the generator, the direction of the field current supplied to the field winding 14 of the first rotor 1 is reversed from the above case. That is, the direction of flow of the magnetic flux from the field winding 14 is now opposite to the direction of flow of magnetic fluxes from the permanent magnets 23 and 33 toward the stator core 51, so that the battery may not be overcharged or the generator may not become the load of the engine. In this latter case, the transistors 71 and 74 in the switching means 7 are turned off while turning on the transistors 72 and 73.

Therefore, the predetermined amount of magnetic fluxes generated from the permanent magnets 23 and 33 is canceled by the amount of magnetic flux generated from the field winding 14 of the first rotor 1. Further, because the current supplied to the field winding 14 is controlled by the switching means 7 so as to control the battery voltage to a predetermined level, the lighter the load the smaller the amount of current required to charge the battery. Thus, a large current is supplied to the field winding 14 so as to sufficiently cancel the magnetic fluxes generated from the permanent magnets 23 and 33.

Because the first rotor 1 must have a reaction magnetic flux generation capability that can cancel the total amount of magnetic fluxes generated from the permanent magnets 23 and 33, the magnetic flux generation capabilities of these two kinds of field parts must be selected to be substantially equal to each other from the aspect of the principle of design. Also, the design principle for rotary electric machines teaches that the upper limit of the magnetic flux density in a magnetic gap is to be generally maintained at a universally constant value of about 8 KGauss. On the basis of the design principles described above, the present invention employs the aforementioned relation expressed as (the outer surface areas of the first and second claw portions 12a and 13a)≃(the outer surface areas of the third and fourth claw portions 21a and 22a)+(the outer surface areas of the fifth and sixth claw portions 31a and 32a).

The function of the slight relative displacement of the claw portions illustrated in FIG. 2 will now be described. It is well known that electromagnetic noise is usually generated during operation of rotary electric machines including a generator. It is also well known that one of the sources of generation of such electromagnetic noise is the appearance of a magnetic reluctance fluctuation at opposed positions of the magnetic poles of the stator core and those of the rotor. This fluctuation of the magnetic reluctance induces pulsation of the inductance energy, and this pulsating inductance energy is superposed on the mean torque between the stator and the rotor, thereby giving rise to pulsation of the torque. This pulsating torque is called the slot ripple torque shown in FIG. 3 (or called, for example, a detent torque). It is also well known that this slot ripple torque is a predominant source of generation of the electromagnetic noise. In order to eliminate such a torque ripple, the magnetic poles of the rotors in the generator of the present invention are displaced relative to the teeth (not shown) or the slots of the armature core so as to minimize the magnetic reluctance fluctuation (the slot ripple torque) during rotation of the rotors. The amount of the relative displacement described above is commonly preferably selected to be λ/2, where λ is the slot ripple wavelength. When the relative displacement is so selected, the upper and lower peaks of the waveform cancel each other, thereby minimizing the slot ripple.

When the vehicle is running, the generator does not always operate under its full-loaded condition and usually operates under its half-loaded condition. Taking the above operating condition of the generator into account, the permanent magnets 23 and 33 are arranged so that their magnetic poles are displaced by λ/2 relative to each other. When a heavier load is required or even when such a load is not actually required, the claw portions 12a and 13a of the first rotor 1 are magnetized. In each of these cases, each of the first claw portions 12a of the first rotor 1 positioned between the corresponding fourth claw portion 22a of the second rotor 2 and the corresponding fifth claw portion 31a of the third rotor 3 in order to minimize the slot ripple superposition between the claw portions 12a, 13a of the first rotor 1 and the claw portions 21a, 22a, 31a and 32a of the second and third rotors 2 and 3.

The generator having the construction described above is advantageous in that the power output of the generator can be regulated by controlling the field current. In a prior art generator, a copper winding having a heavy weight is wound around an iron core forming a long magnetic path and having a heavy weight to form each of two field systems, and an exciting current must be supplied to each of the field systems. In the generator of the present invention, both the magnetic paths and the exciting parts are formed of the permanent magnets so that they are compact in structure and light in weight. Further, both the amount of heat generated from the rotors and the power consumption of the rotors can be minimized so that a simple cooling means can be used for cooling the rotors. Therefore, the rotors of the generator according to the present invention can be made small in size and light in weight, and their costs can be reduced.

Figure 6:
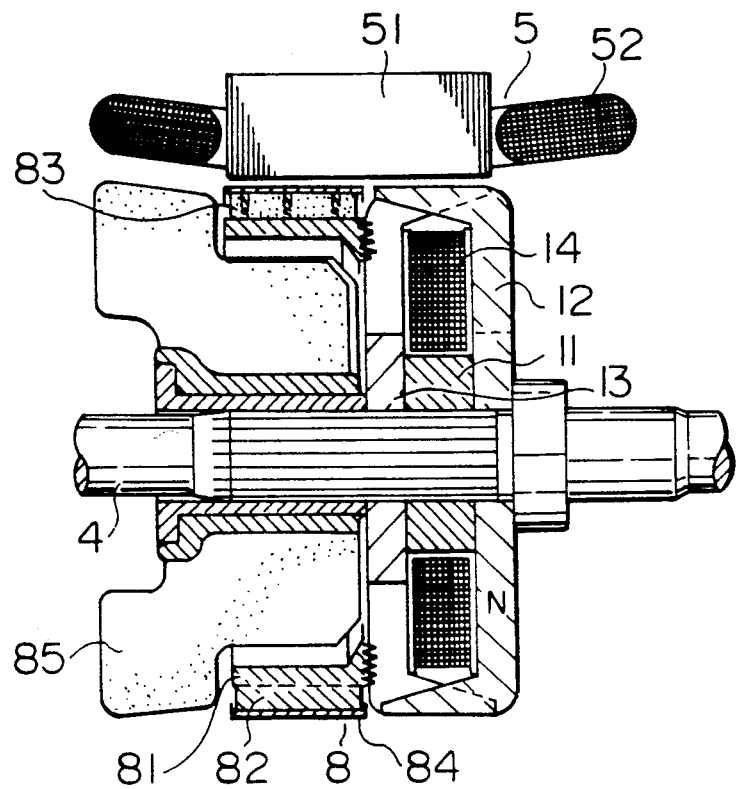
FIG. 6 is a schematic sectional view showing principal parts of a second embodiment of the power generating apparatus of the present invention.
Figure 7:
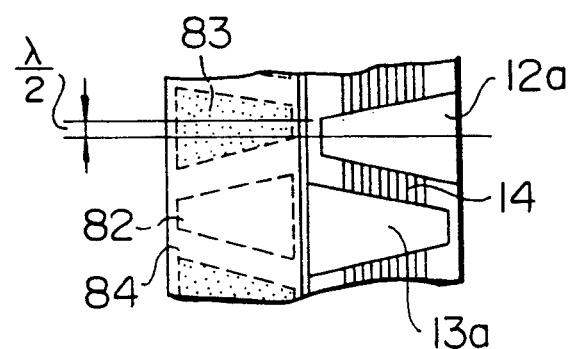
FIG. 7 is a schematic front elevational view showing principal parts of the rotors in the second embodiment shown in FIG. 6.

FIGS. 6 and 7 show a second embodiment of the power generating apparatus of the present invention. This second embodiment is a partial modification of the first embodiment in that the second and third rotors 2 and 3 in the first embodiment are replaced by a fourth rotor 8.

This fourth rotor 8 is composed of a cylindrical yoke 81 fixed to the end surface of the second claw pole 13 of the first rotor 1, six projections 82 which have a trapezoidal shape, which are integrally formed as outer extensions of the cylindrical yoke 81 and which are equally circumferentially spaced from each other as shown in FIG. 7, and six permanent magnets 83 which have a trapezoidal shape and each of which is fixed between the adjacent projections 82 as also shown in FIG. 7. The projections 82 and the permanent magnets 83 are alternately arranged as in the case of the arrangement of the first and second claw portions 12a and 13a of the first rotor 1.

A band 84 in the form of a ring of a non-magnetic material is provided to cover the outer surfaces of the permanent magnets 83 so as to prevent radially outward escapement of the permanent magnets 83 from the rotor 8.

As in the case of the first embodiment, the projections 82 of the fourth rotor 8 are displaced by λ/2 relative to the first claw portions 12a of the first rotor 1.

A space is defined in the cylindrical yoke 81, and a centrifugal type axial mixer fan 85 of a molded resin may be fixedly mounted on the shaft 4 in the internal space of the cylindrical yoke 81. The fan 85 mounted on the shaft 4 protrudes partly from the end surface of the fourth rotor 8 so as to cool both the field winding 14 and the stator winding 52.

Figure 8:
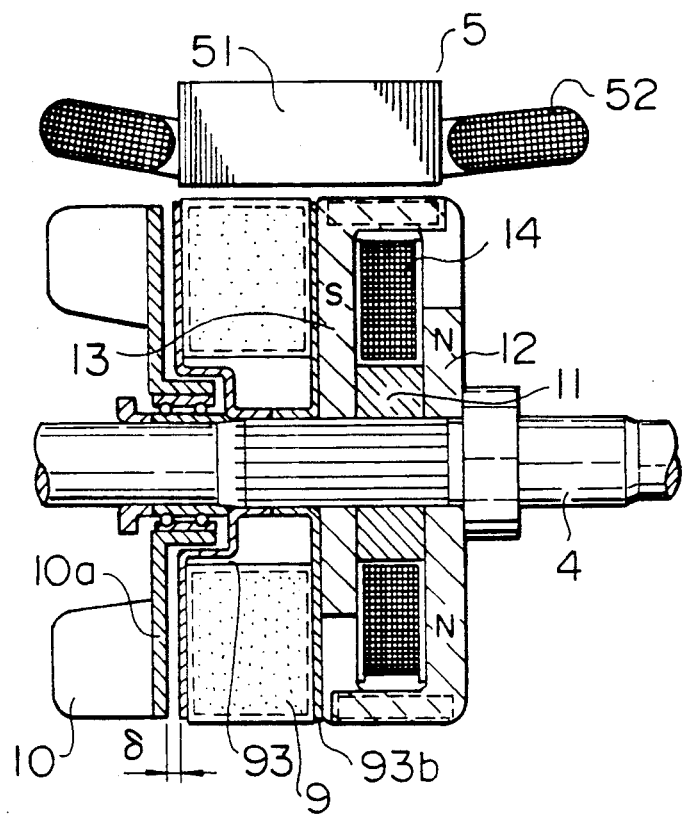
FIG. 8 is a schematic sectional view showing principal parts of a third embodiment of the power generating apparatus of the present invention.
Figure 9:
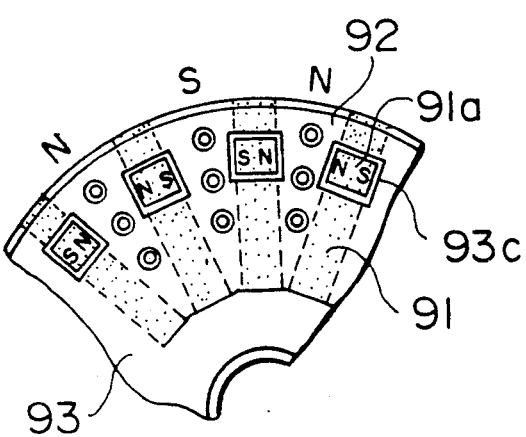
FIG. 9 is a schematic front elevational view showing principal parts of the rotors in the third embodiment shown in FIG. 8.

FIGS. 8 and 9 show a third embodiment of the power generating apparatus of the present invention. This third embodiment is also a partial modification of the first embodiment in that the second and third rotors 2 and 3 in the first embodiment are replaced by a fifth rotor 9. This fifth rotor 9 is composed of a plurality of polyhedral permanent magnets 91, and a plurality of pole pieces 92 of a cold-forged soft steel each of which is disposed between the adjacent permanent magnets 91 and is tapered toward the shaft 4. The combination of the permanent magnets 91 and the pole pieces 92 constitutes the fifth rotor 9 having a cylindrical shape.

A non-magnetic metal plate 93 shaped by drawing with a press consists of a cylindrical portion 93a fixed on the shaft 4, and a pair of disc-shaped portions 93b disposed on the end surfaces of both the permanent magnets 91 and the pole pieces 92. As shown in FIG. 9, each of the disc-shaped portions 93b of the metal plate 93 is provided with a plurality of holes 93c each of which is engageable with a projection 91a formed on the axial end surface of the associated permanent magnet 91. Thus, when the projections 91a of the permanent magnets 91 are fit in the associated holes 93c of the disc-shaped portions 93b of the metal plate 93, radially outward escapement of the permanent magnets 91 can be prevented.

The disc-shaped portions 93b of the metal plate 93 are pressure-welded to the end surfaces of the pole pieces 92 so as to fix the pole pieces 92 to the metal plate 93.

A cooling fan 10 having a member 10a of a magnetic material supporting blades is freely rotatably mounted on the shaft 4. The magnetic member 10a of the cooling fan 10 is spaced from the rotor 9 by a predetermined distance δ which is suitably determined on the basis of the required magnetic force, the accuracy of fabrication, etc. With the rotation of the generator, the cooling fan 10 receives leakage magnetic flux from the permanent magnets 91 of the fifth rotor 9 and is driven by the magnetic force to rotate while following up the rotation of the rotor 9. However, when the rotation speed of the rotor 9 increases up to a predetermined high level, a balance is reached between the magnetic force rotating the cooling fan 10 and the wind pressure acting on the blades of the fan 10, so that the fan 10 would not follow up the rotation of the rotor 9 at speeds higher than the predetermined setting. Thus, any excessive centrifugal force is not imparted to the blades of the cooling fan 10, so that the cooling fan 10 can be designed to be able to exhibit a highest possible cooling capability thereby greatly increasing the cooling effect. The use of such a cooling fan 10 can contribute to the attainment of the desired reduction in the size of the generator.

The aforementioned embodiments do not specify as to whether the rotor having the permanent magnets is to be disposed at an axial position on the shaft before or after the rotor having the field winding. However, it is apparent that these rotors are to be disposed at positions where their temperature rise can be suppressed to a minimum. For example, the temperature is generally high on the side where the rectifier is disposed or where the heat generated from the engine is higher. It is therefore preferable that the rotor having the permanent magnets is to be disposed on the side remote from such side.

In the first, second and third embodiments of the present invention described above, the second, third, fourth and fifth rotors 2, 3, 8 and 9 using the permanent magnets are shown by way of example. However, it is apparent that the present invention is in no way limited to such specific arrangements of these permanent magnets and magnetic poles.

I claim:
1. A power generating apparatus comprising:
a stator including an armature core and a polyphase output winding wound around said armature core;
a plurality of rotors disposed inside said armature core and mounted on a rotary shaft, said rotors establishing first and second field magnetic circuits arranged in parallel with respect to said armature core,
said first field magnetic circuit including a plurality of claw poles and a plurality of permanent magnets acting as a source of exciting magnetomotive force to generate a permanent magnetic flux penetrating said armature core,
said second field magnetic circuit being independent of said first field magnetic circuit and including a plurality of claw poles and a field winding, said field winding forming an electromagnet acting as a source of exciting magnetomotive force, and
a total area of said claw poles included in said first field magnetic circuit being substantially equal to a total area of said claw poles included in said second field magnetic circuit; and
control means for controlling the voltage across the polyphase output winding; said control means operating in a first control mode to increase a voltage induced across said polyphase output winding by supplying a first current to said field winding which causes said second field magnetic circuit to generate a first magnetic flux, said first magnetic flux penetrating said armature core and having the same direction as said permanent magnetic flux; said control means operating in a second control mode to decrease the voltage induced across said polyphase output winding by supplying a second current to said field winding which causes said second field magnetic circuit to generate a second magnetic flux, said second magnetic flux penetrating said armature core and having a direction opposite that of said permanent magnetic flux.

2. A power generating apparatus comprising:
a stator including an armature core and polyphase output winding wound across said armature core;
a plurality of rotors disposed inside said armature core and mounted on a rotary shaft, said rotors establishing first and second field magnetic circuits arranged in parallel with respect to said armature core,
said first field magnetic circuit for generating a permanent magnetic flux penetrating said armature core, and including a plurality of claw poles disposed opposite to each other and a plurality of permanent magnets held between said claw poles,
said second field magnetic circuit being independent of said first field magnetic circuit and including a plurality of claw poles disposed opposite to each other and a field winding held between said claw poles, and
a total area of said claw poles included in said first field magnetic circuit being substantially equal to the total area of said claw poles included in said second field magnetic circuit; and
control means for controlling the voltage across the polyphase output winding; said control means operating in a first control mode to increase a voltage induced across said polyphase output winding by supplying a first current to said field winding which causes said second field magnetic circuit to generate a first magnetic flux, said first magnetic flux penetrating said armature core and having the same direction as said permanent magnetic flux; said control means operating in a second control mode to decrease the voltage induced across said polyphase output winding by supplying a second current to said field winding which causes said second field magnetic circuit to generate a second magnetic flux, said second magnetic flux penetrating said armature core and having a direction opposite that of said permanent magnetic flux.

3. A power generating apparatus according to claim 2, wherein said permanent magnets are disc-shaped.

4. A power generating apparatus according to claim 2, wherein said claw poles in said first field magnetic circuit and said claw poles in said second field magnetic circuit contact each other at their end surfaces in a direction of said rotary shaft.

5. A power generating apparatus according to claim 2, wherein claw portions of said claw poles in said first field magnetic circuit and claw portions of said claw poles in said second field magnetic circuit are angularly displaced form each other by substantially one half of a slot ripple wavelength in a circumferential direction of said rotary shaft.

6. A power generating apparatus according to claim 2, further comprising a means for blowing cooling air therethrough, and wherein said first field magnetic circuit is disposed on said rotary shaft upstream from where said second field magnetic circuit is disposed with respect to said cooling air.

7. A power generating apparatus comprising:
a stator including an armature core and polyphase output winding wound around said armature core;
a plurality of rotors disposed inside said armature core and mounted on a rotary shaft, said rotors establishing first and second field magnetic circuits arranged in parallel with respect to said armature core;
said first field magnetic circuit for generating a permanent magnetic flux penetrating said armature core, and including a plurality of claw poles extruding from a cylindrical yoke and a plurality of claw shaped permanent magnets each arranged alternately with each of said claw poles, said claw shaped permanent magnets fixed on the outer circumferential surface of said cylindrical yoke,
said second field magnetic circuit being independent of said first field magnetic circuit and including a plurality of claw poles disposed opposite to each other and a field winding held between said claw poles, and
a total area of said claw poles and claw shaped permanent magnets in said first field magnetic circuit being substantially equal to a total area of said claw poles in said second field magnetic circuit; and
control means for controlling the voltage across the polyphase output winding; said control means operating in a first control mode to increase a voltage induced across said polyphase output winding by supplying a first current to said field winding which causes said second field magnetic circuit to generate a fist magnetic flux, said first magnetic flux penetrating said armature core and having the same direction as said permanent magnetic flux; said control means operating in a second control mode to decrease the voltage induced across said polyphase output winding by supplying a second current to said field winding which causes said second field magnetic circuit to generate a second magnetic flux, said second magnetic flux penetrating said armature core and having a direction opposite that of said permanent magnetic flux.

8. A power generating apparatus according to claim 7, wherein the plurality of claw poles and claw shaped magnets of said first field magnetic circuit are of trapezoidal shape.

* * * * *